US012652515B2

(12) United States Patent
Shin

(10) Patent No.: US 12,652,515 B2
(45) Date of Patent: Jun. 9, 2026

(54) EMERGENCY CALL SYSTEM FOR VEHICLE AND METHOD THEREOF

(71) Applicants: Hyundai Motor Company, Seoul (KR); KIA CORPORATION, Seoul (KR)

(72) Inventor: Yong Woo Shin, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 696 days.

(21) Appl. No.: 18/072,829

(22) Filed: Dec. 1, 2022

(65) Prior Publication Data

US 2023/0362613 A1 Nov. 9, 2023

(30) Foreign Application Priority Data

May 3, 2022 (KR) .......................... 1020220054631

(51) Int. Cl.
H04W 4/40 (2018.01)
H04W 4/02 (2018.01)
H04W 4/90 (2018.01)
(52) U.S. Cl.
CPC ............. *H04W 4/90* (2018.02); *H04W 4/025* (2013.01); *H04W 4/40* (2018.02)
(58) Field of Classification Search
CPC ...................................................... H04W 4/90
USPC ...................................................... 455/404.1
See application file for complete search history.

(56) References Cited

U.S. PATENT DOCUMENTS

| | | | | |
|---|---|---|---|---|
| 10,270,727 | B2 * | 4/2019 | Philipson | H04L 51/222 |
| 11,812,356 | B2 * | 11/2023 | Nagasawa | H04W 4/90 |
| 2006/0276168 | A1 * | 12/2006 | Fuller | H04W 4/90 |
| | | | | 455/456.1 |
| 2010/0202368 | A1 * | 8/2010 | Hans | H04W 4/90 |
| | | | | 370/352 |
| 2011/0151839 | A1 * | 6/2011 | Bolon | H04W 4/21 |
| | | | | 455/414.1 |
| 2014/0257594 | A1 * | 9/2014 | Hashimoto | G07C 5/085 |
| | | | | 701/1 |
| 2018/0137698 | A1 * | 5/2018 | Yasuda | H04N 7/18 |
| 2020/0314621 | A1 * | 10/2020 | Cohen | H04W 76/50 |

FOREIGN PATENT DOCUMENTS

| | | |
|---|---|---|
| JP | 2008296682 A | 12/2008 |
| JP | 2019154016 A | 9/2019 |
| KR | 100857766 B1 | 9/2008 |
| KR | 20080091587 A | 10/2008 |

* cited by examiner

*Primary Examiner* — Qutbuddin Ghulamali
(74) *Attorney, Agent, or Firm* — Fish & Richardson P.C.

(57) ABSTRACT

An emergency call system may comprise a call generator configured to generate an emergency call upon receiving a command for doing so from a user, the call generator provided in the vehicle, and a controller configured to collect emergency data at predetermined time intervals from the start of the vehicle, generate a dataset including the emergency data collected for a predetermined period of time, and transmit the dataset to an emergency rescue server in response to an occurrence of the emergency call.

17 Claims, 5 Drawing Sheets

FIG. 1

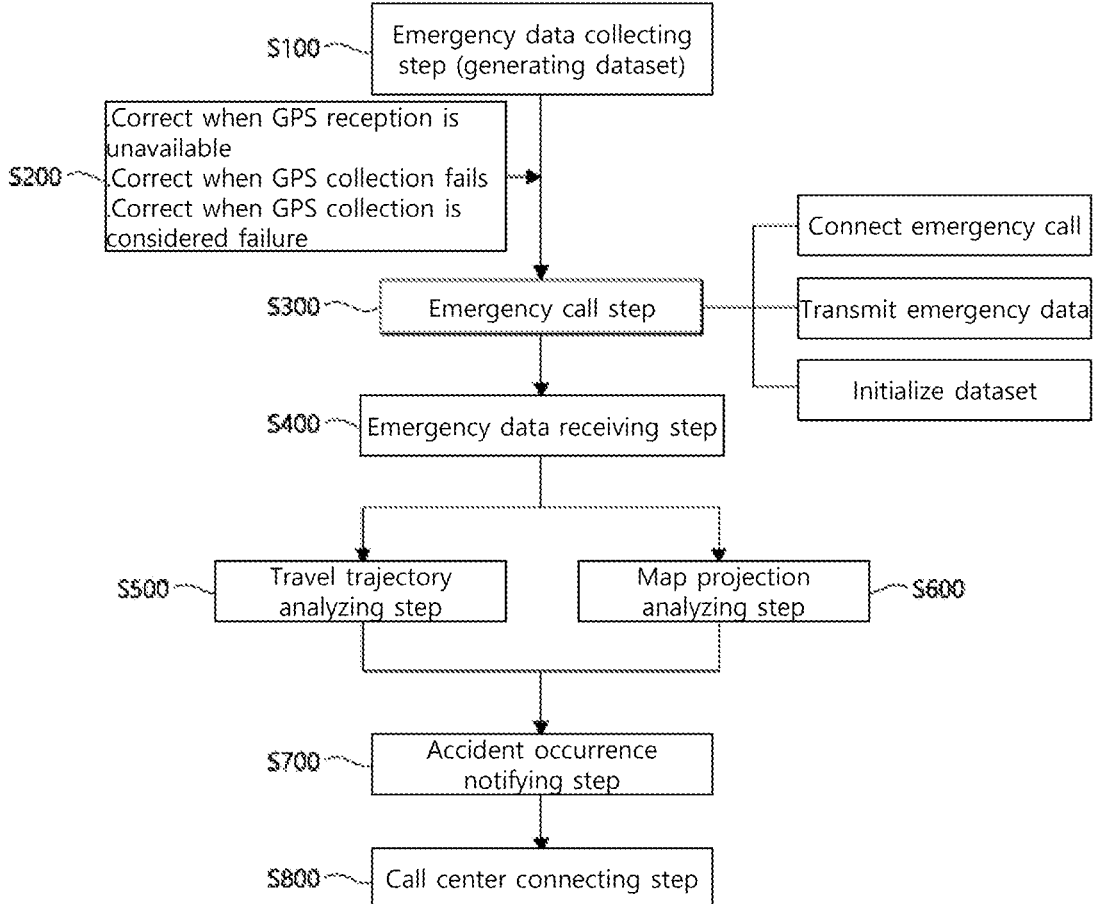

S100 — Emergency data collecting step (generating dataset)

S200 — Correct when GPS reception is unavailable
Correct when GPS collection fails
Correct when GPS collection is considered failure S300 — Emergency call step Connect emergency call Transmit emergency data Initialize dataset S400 — Emergency data receiving step S500 — Travel trajectory analyzing step Map projection analyzing step — S600

S700 — Accident occurrence notifying step

S800 — Call center connecting step

FIG. 5

EMERGENCY CALL SYSTEM FOR VEHICLE AND METHOD THEREOF

CROSS-REFERENCE TO RELATED APPLICATION

This application claims the benefit of Korean Patent Application No. 10-2022-0054631, filed on May 3, 2022, which is hereby incorporated by reference in its entirety.

TECHNICAL FIELD

The present disclosure relates to an emergency call system and method for a vehicle that transmits vehicle operation information accumulated for a predetermined period of time along with an emergency rescue request to an emergency rescue server, thereby improving the accuracy and reliability of vehicle location estimation.

BACKGROUND

In general, vehicles are equipped with an emergency rescue function that allows a driver or passenger on board to make an emergency rescue request to an external server or a call center in case of an occurrence of an emergency rescue situation.

The emergency rescue function may request a rescue by calling to a preset call center using a head unit (HU) provided in a vehicle when an occupant of the vehicle presses a button such as an emergency call or an SOS call. In addition, the emergency rescue function may transmit state information and current location information of the vehicle to a preset server to be used for an emergency rescue.

A conventional emergency call method includes transmitting information on a location and a traveling direction of a vehicle at an emergency rescue request. In the conventional method, the accuracy of global positioning system (GPS) data measured by a GPS module of the vehicle may not be guaranteed 100%, and thus a rescue site may not be readily identified.

In another conventional emergency call method, albeit occurring with a low probability, where an arbitrary value that is not a current measured value in the GPS data measured by the GPS module may be transmitted as current location information. In the another conventional method, where an error occurs temporarily in the GPS module, a delay in identifying a rescue site may be inevitable.

In addition, when a current location of a vehicle is identified based solely on current GPS data measured by the GPS module, an accurate location of the vehicle may not be identified from between an overpass or a road below the overpass, for example.

Further, when a speed of a vehicle at a specific point in time, for example, a time immediately before an accident, is obtained as vehicle information, the vehicle information may not be sufficient to identify a traveling situation of the vehicle.

SUMMARY

The present disclosure is directed to an emergency call system and method for a vehicle that may transmit, to an emergency rescue server, vehicle operation information accumulated for a predetermined period of time together with an emergency rescue request, thereby improving the accuracy and reliability of vehicle location estimation.

To achieve the objects described above, there is provided an emergency call system for a vehicle, the emergency call system comprising a call generator and a controller.

The call generator may be configured to generate an emergency call upon receiving a command for doing so from a user. The call generator may be provided in the vehicle and comprise a call button or a SOS button equipped in the vehicle.

The controller may be configured to collect emergency data at predetermined measurement time intervals from the start of the vehicle, generate a dataset with emergency data collected for a recent predetermined period of time, and transmit the generated dataset to an emergency rescue server in response to an occurrence of an emergency call.

The emergency call system may further comprise the emergency rescue server configured to receive, from the controller, the emergency data formed as the dataset and store therein the received pieces of emergency data, and estimate a current location of the vehicle by analyzing a location and a traveling direction of the vehicle based on the emergency data.

The controller may include an emergency data collector configured to collect the emergency data including location information of the vehicle, for a predetermined period of time, and generate the collected emergency data as a single dataset, and an emergency call controller configured to transmit, to the emergency rescue server, the emergency data formed as the dataset as information for determining a location and a state of the vehicle when the emergency call is executed.

The emergency data collector may collect, as the emergency data, at least one of latitude and longitude information, traveling direction information, location accuracy-related information, or an instantaneous speed of the vehicle, for each measurement time interval.

The emergency call system may further include a data corrector configured to, when reliability of data collected by the emergency data collector is not secured, replace the data with new data or correct the data, and store the new data or the corrected data.

When global positioning system (GPS) data is not received from a GPS module, the data corrector may correct the latitude and longitude information of the vehicle using navigation information received from a navigation system and store the corrected information.

In response to a failure to collect the emergency data at a time point, the data corrector may delete some of the emergency data collected at the time point, and replace with normal emergency data collected for a subsequent time point and store the normal emergency data.

When GPS data received from the GPS module indicates a location where the vehicle is not able to move, based on a comparison with GPS data collected immediately before a previous measurement time interval, the data corrector may determine a failure to collect the GPS data.

When a head unit (HU) of the vehicle enters a sleep state, the emergency call controller may initialize the dataset by deleting the emergency data included in the dataset.

The emergency rescue server may include an emergency data receiver configured to receive the dataset transmitted from the controller and store the received dataset in a memory device, and verify pieces of emergency data stored in the dataset, and a travel trajectory analyzer configured to determine a change in a location of the vehicle based on the pieces of emergency data, analyze a travel trajectory of the vehicle during a time period for which the emergency data are collected, and estimate a current location of the vehicle.

The emergency rescue server may further include a map projection analyzer configured to project the latitude and longitude information of the vehicle during the predetermined period obtained from the emergency data onto a map, and estimate the current location of the vehicle.

The emergency rescue server may further include an accident occurrence notifier configured to estimate an actual location of a reported vehicle for which the emergency call is requested, and then transmit a notification of an accident to nearby vehicles whose current locations are determined to be near the reported vehicle.

To achieve the objects described above, there is provided an emergency call method for a vehicle, the emergency call method including an emergency data collecting step of collecting, at predetermined measurement time intervals, emergency data from which location information of a currently traveling vehicle is identifiable and generating a single dataset with pieces of emergency data collected for a recent predetermined period of time, an emergency call step of connecting a call to a call center when an emergency call is executed, and transmitting the pieces of emergency data formed as the dataset from a controller to an emergency rescue server, an emergency data receiving step of receiving the dataset transmitted from the controller and storing the received dataset in a memory device, and verifying the pieces of emergency data stored in the dataset; and a travel trajectory analyzing step of determining a change in a location of the vehicle based on the pieces of emergency data, analyzing a travel trajectory of the vehicle during the predetermined period for which the pieces of emergency data are collected, and estimating a current location of the vehicle.

When reliability of data collected in the emergency data collecting step is not secured, the emergency call method may further include a data correcting step of replacing the data with new data or correcting the data, and storing the new data or the corrected data.

When data is not received from a GPS module for a measurement time interval, the data correcting step may include correcting latitude and longitude information of the vehicle with navigation information and storing the corrected information.

In response to a failure to collect the emergency data for a measurement time interval, the data correcting step may include deleting some data collected for the measurement time interval, and replacing the data with normal emergency data collected for a subsequent measurement time interval and storing the normal emergency data.

When GPS data received from the GPS module for a measurement time interval indicates a location unavailable for the vehicle to move during the measurement time interval, compared to GPS data collected for an immediately previous measurement time interval, the data correcting step may include determining a failure to collect the GPS data.

When an HU of the vehicle enters a sleep state, the emergency call step may include initializing the dataset by deleting the emergency data included in the dataset.

The emergency call method may further include a map projection analyzing step of projecting the latitude and longitude information of the vehicle during the predetermined period obtained from the pieces of emergency data onto a location on a map indicating the road on which the vehicle is traveling, and estimating a current location of the vehicle requesting the emergency call.

The emergency call method may further include an accident occurrence notifying step of estimating an actual location of a reported vehicle for which the emergency call is requested, and then transmitting a notification of an accident to nearby vehicles whose current locations are determined to be near the reported vehicle.

According to various exemplary implementations described herein, accurately estimating a current location of a vehicle requesting an emergency call using a dataset including emergency data continuously collected for a predetermined period of time prior to an accident occurrence time requiring emergency rescue, in addition to data collected at the accident occurrence time, may enable a quick and accurate dispatch of an emergency rescue vehicle in an urgent situation and may thereby contribute to securing the safety of occupants in the vehicle.

In addition, when global positioning system (GPS) data is not received from a GPS module or received data is less reliable while emergency data is being collected, storing, as a dataset, only highly reliable pieces of data, with the less reliable pieces of data excluded, may improve the accuracy and reliability in location estimation.

Other objects, features, and aspects will be apparent from the following detailed description, the drawings, and the claims.

BRIEF DESCRIPTION OF THE DRAWINGS

FIG. 1 is a block diagram illustrating an emergency call system for a vehicle.

FIG. 5 is a flowchart illustrating an example of an emergency call method for a vehicle.

DETAILED DESCRIPTION

Hereinafter, example implementations of the present disclosure will be described in detail with reference to FIGS. 1 through 5.

Figure 1:
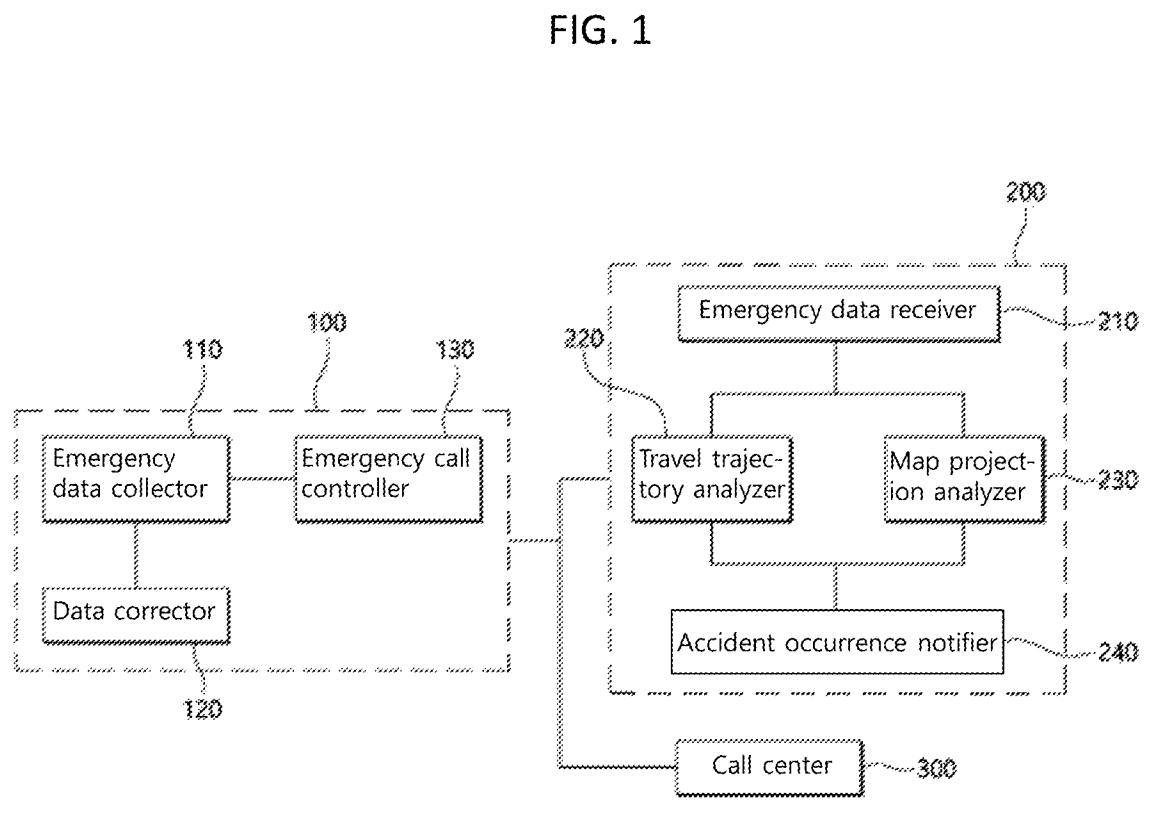
Figure 2:
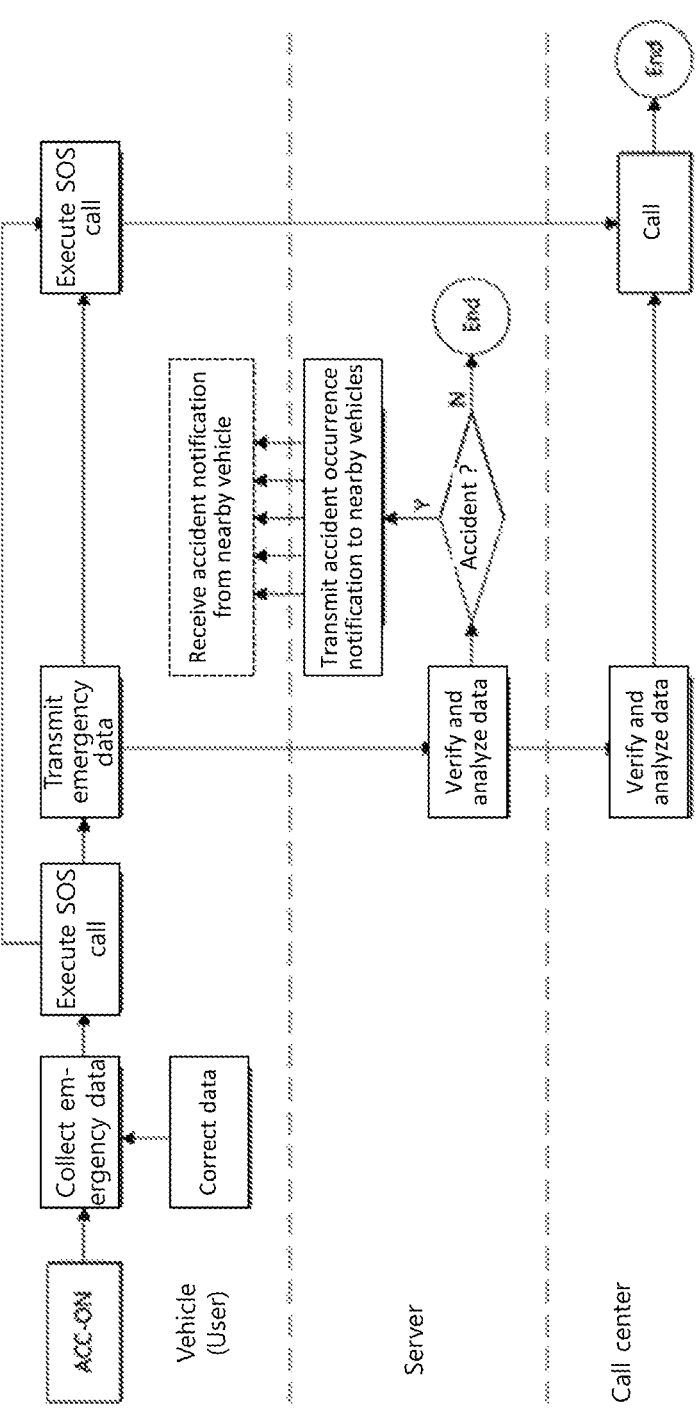
FIG. 2 is a diagram illustrating an example flow of operations of processing an emergency call.

FIG. 1 is a block diagram illustrating an emergency call system for a vehicle, and FIG. 2 is a diagram illustrating a flow of operations of processing an emergency call.

Referring to FIGS. 1 and 2, the emergency call system may include a controller 100 configured to collect emergency data at regular intervals after a vehicle is started (e.g., ACC-ON), generate a single dataset with the emergency data collected for a recent predetermined period of time, and transmit the dataset to an emergency rescue server 200 in response to an occurrence of an emergency call, and the emergency rescue server 200 configured to receive, from the controller 100, the emergency data formed as the dataset and store the received emergency data, analyze a location and a traveling direction of the vehicle based on the emergency data, and estimate a current location of the vehicle.

The controller 100 may be provided in the vehicle, and be embodied as a vehicle control unit (VCU) or an electronic control unit (ECU) that transmits main commands to an engine, a driving motor, a battery, and the like.

The controller 100 may communicate with other subcontrollers or sensors provided in the vehicle to transmit main vehicle-related commands for vehicle control, determination of a vehicle traveling state, torque control, and the like, or to obtain sensing data. In addition, the controller 100 may transmit state and location information of the vehicle to a smartphone of a user or an external server through a communication module (e.g., a modem, Bluetooth, a global positioning system (GPS), etc.).

To perform an emergency call function, the controller 100 may further include an emergency data collector 110 configured to collect pieces of emergency data for determining location information of a currently traveling vehicle at regular measurement time intervals and generate the collected pieces of emergency data as a single dataset; and an emergency call controller 130 configured to transmit, to the emergency rescue server 200, the pieces of emergency data formed as the dataset as information to be used to determine a location and state of the vehicle when the emergency call is executed.

The emergency data collector 110 may continuously collect, from a sensor provided in the vehicle, pieces of emergency data from which a location and a traveling direction of a currently traveling vehicle is determined at regular measurement time intervals for a predetermined period of time, generate the collected emergency data as a single dataset, and store the dataset.

The emergency data from which the location and the traveling direction of the currently traveling vehicle may be determined may include latitude and longitude information of the vehicle, traveling direction information, location accuracy-related information, and an instantaneous speed of the vehicle at each measurement time interval.

The emergency data collector 110 may thus collect the location information of the vehicle by obtaining the latitude and longitude information from a GPS module, and may obtain the traveling direction information from a change in the latitude and longitude information or from a navigation system. The emergency data collector 110 may also collect the location accuracy-related information obtained as a result of comparing the location information obtained from the GPS module and surrounding road information obtained from a camera or the navigation system provided in the vehicle. The emergency data collector 110 may also collect the instantaneous speed of the vehicle at a point in time in each measurement time interval.

As described above, the emergency data collector 110 may iteratively collect the emergency data at measurement time intervals. For example, it is assumed that emergency data is collected with a measurement time interval of 1 second after a vehicle is started (e.g., entering a start-on (ACC-ON) state). The measurement time interval may also be set to be shorter or longer than 1 second, for example.

The emergency data collector 110 may also generate a dataset from which the location information of the vehicle is identifiable by collecting emergency data and accumulatively storing the emergency data collected at each predetermined measurement time interval for a predetermined period of time. In the foregoing example, it is also assumed that the predetermined period of time for which the single dataset is generated is 600 seconds, and the dataset includes 600 pieces of emergency data.

In this example, the predetermined period of time for which the single dataset is generated may also be set to be shorter or longer than 600 seconds. However, if the period of time is set to be extremely short, the number of accumulated pieces of emergency data may decrease, and the reliability of the location estimation of the vehicle may thereby be degraded. Thus, it may be desirable to set the period not to be extremely short.

In addition, since the emergency data collector 110 generates the dataset using only the pieces of emergency data for the predetermined period of time, the emergency data collector 110 may delete the oldest piece of emergency data in the dataset and newly add the latest pieces of emergency data, when the number of pieces of emergency data collected for each measurement time interval exceeds a maximum number.

For example, in a case in which the measurement time interval for which emergency data is stored in a dataset is 1 second and the predetermined period of time for which the dataset is generated is 600 seconds, the emergency data collector 110 may generate the dataset using only 600 pieces of emergency data. In this example, when emergency data is collected at a second of 601, the emergency data collector 110 may delete emergency data collected at a second of 1 and store the emergency data collected at the second of 601 may be newly stored, and the dataset may thereby be generated.

Accordingly, the pieces of emergency data included in the dataset may indicate a latest vehicle traveling situation while being maintained at a consistent total amount of stored data, thereby contributing to maintaining data freshness.

In addition, since the emergency data collector 110 collects the location information of the currently traveling vehicle based on the GPS module, the accuracy of GPS data measured by the GPS module may not be guaranteed, which is an issue arising from the related art. To improve the reliability of the location information collected based on the GPS module, the emergency call system may further include a data corrector 120 configured to correct data with new data, when the reliability of the GPS data obtained from the GPS module or data obtained from other sensors is not secured.

When the data is not received from the GPS module during a measurement time interval, the data corrector 120 may correct and store the latitude and longitude information of the vehicle using navigation information received from a navigation system in the vehicle.

In addition, when failing to collect the emergency data for a measurement time interval, the data corrector 20 may delete some data collected for the measurement time interval, and replace the data with normal emergency data collected for a subsequent measurement time interval and store the normal emergency data.

In this case, such a failure to collect the emergency data may include a failure to collect all data, and also a failure to collect any one of pieces of emergency data set as a target to be collected. In response to a failure to collect any one of the pieces of emergency data to be collected, an error may occur in a structure of the dataset or an error in data analysis in the emergency rescue server 200. Thus, it may be desirable to replace data of a measurement time interval after all the data is collected.

In addition, when the latitude and longitude information, which is GPS data received from the GPS module for a measurement time interval, indicates a location unavailable for the vehicle to move during the measurement time interval, compared to GPS data collected for an immediately previous measurement time interval, the data corrector 120 may determine a collection failure even when the latitude and longitude information is collected as the GPS data.

The data corrector 120 may compare the GPS data obtained from the GPS module and the GPS data obtained for the immediately previous measurement time interval, as described above, to determine data validity. When it is considered the collection failure, the data corrector 120 may delete emergency data including corresponding GPS data and collect, as emergency data to be included in the dataset, GPS data collected for a subsequent measurement time interval.

Accordingly, it is possible to minimize an error of location estimation that may occur when the GPS data measured by the GPS module transmits an arbitrary value that is not a measured value, with a low probability.

In addition, when a call generator, which is configured to generate an emergency call upon receiving a command for doing so from a user, generate an emergency call (e.g., an emergency call button or an SOS call button provided in the vehicle is pushed to generate a command signal for generating the emergency call), the emergency call controller 130 may connect a call to a call center 300 preset to be available for calls, using a head unit (HU).

In this case, to notify a current location and state of the vehicle having an accident requiring emergency rescue, the emergency call controller 130 may access the emergency rescue server 200 and then transmit the dataset generated in the emergency data collector 110 to the emergency rescue server 200, using a preset communication network.

According to the related art, when the emergency call button is pressed, GPS information indicating a location of the vehicle at that point in time may be collected, and direction information associated with a direction in which the front of the vehicle faces may be obtained and transmitted. In contrast, the emergency call controller 130 may transmit the dataset in which pieces of emergency data are accumulated for a predetermined period of time before the emergency call button is pressed.

For example, when the emergency call button is pressed before a sufficient number of pieces of emergency data for generating a dataset is stored, the emergency call controller 130 may generate the dataset only with pieces of emergency data collected from the start of the vehicle and transmit the generated dataset.

In addition, when the HU of the vehicle enters a sleep state, the emergency call controller 130 may initialize the dataset by deleting pieces of emergency data included in the dataset. When the vehicle returns to the start-on state, the emergency call controller 130 may collect pieces of emergency data after the vehicle is started again and generate a new dataset.

Even after the emergency call button is pressed and the dataset including the pieces of emergency data is transmitted, the emergency call controller 130 may not delete the emergency data stored in the dataset or initialize the dataset. In this case, the pieces of emergency data stored in the dataset may be used as data to determine a cause of an accident that triggers an emergency rescue situation.

In addition, the emergency rescue server 200 may include an emergency data receiver 210 configured to receive the dataset transmitted from the controller 100, store the dataset in a memory device, and verify the pieces of emergency data stored in the dataset; and a travel trajectory analyzer 220 configured to estimate a current location of the vehicle by identifying a change in the location of the vehicle based on the pieces of emergency data and analyzing a travel trajectory of the vehicle for the predetermined period of time for which the pieces of emergency data are collected.

The travel trajectory analyzer 220 may analyze a moving direction and a travel trajectory of the vehicle based on the latitude and longitude information of the vehicle and information on the traveling direction for the predetermined period of time, which are obtained from the pieces of emergency data.

That is, the emergency data may include a continuous change in the location of the vehicle for a predetermined period of time (e.g., 600 seconds), and it may thus be possible to obtain the moving direction and the travel trajectory by connecting such changes in the location of the vehicle and matching, onto a road, such changed locations of the vehicle.

Figure 3:
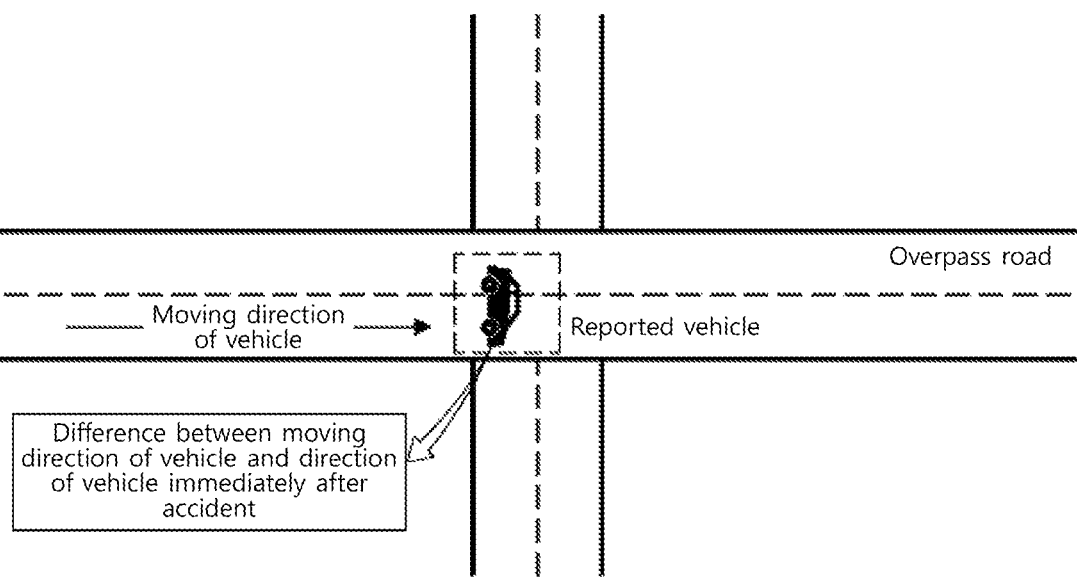
FIG. 3 is a diagram illustrating an example of estimating a location of a vehicle based on a travel trajectory analysis.

For example, in a case where a vehicle traveling in a predetermined moving direction on an overpass with a road below running in a vertically different direction has an accident and a front side of the vehicle rotates in a vertical direction due to the accident, as shown in FIG. 3, an emergency rescue server may erroneously recognize that a reported vehicle is located on the other road vertically located below the overpass when only the location information (e.g., latitude and longitude) of the vehicle at an emergency call point and information on the direction in which the front side of the vehicle faces are received, according to the related art.

However, in some implementations, when both the location information (e.g., latitude and longitude) and the traveling direction information of the vehicle that are collected for a predetermined period of time are received, the emergency rescue server 200 may accurately determine that the reported vehicle is located on the overpass based on location information at a previous time before an emergency call, and may thus instruct an emergency rescue vehicle to be dispatched quickly and accurately.

In addition, the emergency rescue server 200 may further include a map projection analyzer 230 configured to project the latitude and longitude information of the vehicle for the predetermined period of time obtained from the emergency data onto a location on a map indicating the road on which the vehicle is traveling and estimate a current location of the vehicle requesting an emergency call.

When the emergency call is requested due to an accident occurring near a road junction where entry and exit are complicated, there may be a probability that a location on another nearby junction, rather than an actual location of the reported vehicle, is incorrectly determined. When the junction is incorrectly determined for a location of the reported vehicle as described above, there may be a risk of causing another accident and a great amount of time may be used until a return to the reported vehicle.

Figure 4:
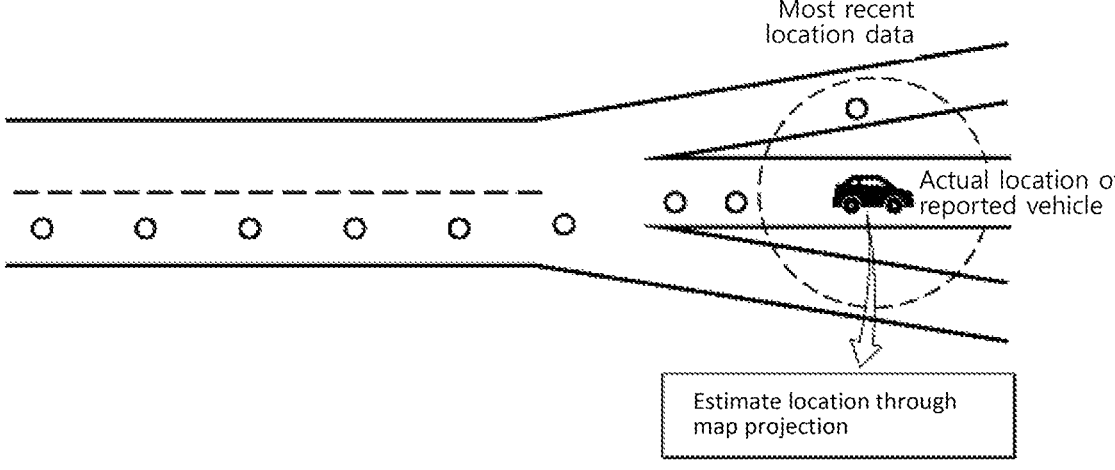
FIG. 4 is a diagram illustrating an example of estimating a location of a vehicle based on a map projection analysis.

Accordingly, as shown in FIG. 4, the map projection analyzer 230 may estimate the location of the vehicle while projecting the location information of the vehicle on the road map one by one, thereby improving the accuracy in estimating the actual location of the vehicle.

In addition, the emergency rescue server 200 may further include an accident occurrence notifier 240 configured to transmit a notification of an accident to nearby vehicles of which current locations are determined to be around the reported vehicle after estimating the actual location of the reported vehicle for which the emergency call is requested.

By notifying the nearby vehicles of the occurrence of an accident by the accident occurrence notifier 240, it may be possible to draw attention from drivers of the nearby vehicles and expect prompt assistance therefrom when they are available to participate in emergency rescue.

As described above, the emergency rescue server 200 may accurately estimate a current location of a vehicle requesting an emergency call by using pieces of emergency data included in a dataset and may thus facilitate a prompt and accurate dispatch in an urgent situation, thereby contributing to ensuring the safety of occupants in the vehicle.

FIG. 5 is a flowchart illustrating an example of an emergency call method for a vehicle.

Referring to FIG. 5, in some implementations, the emergency call method for a vehicle may include: an emergency data collecting step S100 of collecting emergency data from which location information of a traveling vehicle is identifiable and generating, as a single dataset, pieces of emergency data collected for a recent predetermined period of time; an emergency call step S300 of connecting a call to a call center when an emergency call is executed and transmitting the pieces of emergency data formed as the dataset to an emergency rescue server; an emergency data receiving step S400 of receiving the dataset transmitted from the controller, storing it in a memory device, and verifying the emergency data stored in the dataset; and a travel trajectory analyzing step S500 of estimating a current location of the vehicle by identifying a change in the location of the vehicle based on the emergency data and analyzing a travel trajectory of the vehicle for the predetermined period for which the emergency data is collected.

The emergency data collecting step S100 may include continuously collecting pieces of emergency data from which the location and the traveling direction of the currently traveling vehicle is identifiable, at predetermined measurement time intervals for a predetermined period of time, and generating and storing a single dataset.

Accordingly, in the emergency data collecting step S100, the pieces of emergency data may be iteratively collected at the measure intervals (e.g., 1 second) for the predetermined period (e.g., 600 seconds) after the vehicle enters a start-on state.

In this case, the emergency data may include, for example, latitude and longitude information, traveling direction information, location accuracy-related information, and an instantaneous speed of the vehicle, for each measurement time interval.

Since the dataset is generated using only the pieces of emergency data collected for the predetermined period, the emergency data collecting step S100 may further include deleting the oldest emergency data in the dataset and adding recent emergency data, when the number of the pieces of emergency data collected for each measurement time interval exceeds a maximum number. Thus, a total amount of data may be maintained consistently.

In addition, when the reliability of the data collected in the emergency data collecting step S100 is not secured, the emergency call method may include the data correcting step S200 of replacing or correcting the data with or to new data.

For example, when data is not received from the GPS module during a measurement time interval, the data correcting step S200 may include correcting and storing the latitude and longitude information of the vehicle using navigation information.

In addition, in response to a failure to collect emergency data for a measurement time interval, the data correcting step S200 may include selecting some data collected during the measurement time interval, and replacing and storing the data with normal emergency data collected for a subsequent measurement time interval.

In this case, the failure to collect the emergency data may include a case in which any one of pieces of emergency data set as a target to be collected is not collected, in addition to a case in which all the pieces of data are not collected.

In addition, when the latitude and longitude information of GPS data received from the GPS module is determined to indicate a location where the vehicle is not able to move, based on a comparison with that of GPS data collected immediately before a previous measurement time interval, the data correcting step S200 may include determining a collection failure.

Even when the collection failure is determined as described above, the data correcting step S200 may include deleting emergency data including the corresponding GPS data and collecting GPS data to be collected for a subsequent measurement time interval as emergency data to be included in the dataset.

The emergency call step S300 may include connecting a call to the call center that is set in advance to call using a HU, when an emergency call button or SOS call button provided in the vehicle is pressed.

In this case, to notify a current location and state of the vehicle from which an accident requiring emergency rescue occurs, the emergency call step S300 may include accessing the emergency rescue server and transmitting the dataset including the pieces of emergency data to the emergency rescue server, using a preset communication network.

When the emergency call button is pressed before a sufficient amount of emergency data for generating the dataset is stored, the emergency call step S300 may include generating the dataset using only pieces of emergency data collected after the vehicle is started (e.g., entering a start-on state) and transmitting the dataset.

In addition, when the HU of the vehicle enters a sleep state, the emergency call step S300 may include initializing the dataset by deleting the emergency data included in the dataset. Subsequently, when the vehicle enters again the start-on state, the emergency call step S300 may include generating a new dataset by collecting again pieces of emergency data from when the vehicle is started.

In this case, even after the emergency call button is pressed and the dataset including the pieces of emergency data are transmitted, the emergency data stored in the dataset may not be deleted, and the dataset may not be initialized in the emergency call step S300.

The travel trajectory analyzing step S500 may include analyzing a moving direction and a travel trajectory of the vehicle based on the latitude and longitude information and the information on the traveling direction of the vehicle for the predetermined period obtained from the emergency data.

That is, since the emergency data includes a continuous change in the location of the vehicle for the predetermined period, the moving direction and the travel trajectory of the vehicle may be derived by connecting such changed locations of the vehicle and matching the locations of the vehicle to the road.

In addition, the emergency call method may further include a map projection analyzing step S600 of estimating a current location of the vehicle requesting the emergency call by projecting, onto a location on a map indicating the road on which the vehicle is traveling, the latitude and longitude information of the vehicle obtained from the emergency data for the predetermined period.

In the map projection analyzing step S600, the location of the vehicle may be estimated through the projection of the location information of the vehicle onto the road map one by one. It may thus be possible to improve the accuracy in estimating an actual location of the vehicle.

In addition, the emergency call method may further include an accident occurrence notifying step S700 of estimating an actual location of the reported vehicle requesting the emergency call, and transmitting a notification of an accident to nearby vehicles whose current location is determined to be near the reported vehicle in the emergency rescue server.

In addition, the emergency call method may further include a call center connecting step S800 of executing the call between an occupant of the vehicle and the call center using the HU, and receiving, from the call center, the location information of the vehicle received from the emergency rescue server, and executing the call for verifying a location estimated from the occupant and taking measures for the accident.

On the other hand, the present disclosure described above may be implemented as computer-readable code on a medium in which a program is recorded. The computer-readable medium includes all types of recording devices in which data readable by a computer system is stored. Examples of the computer-readable medium include a hard disk drive (HDD), a solid-state drive (SSD), a silicon disk drive (SDD), a ROM, a RAM, a CD-ROM, a magnetic tape, a floppy disk, an optical data storage device, etc.

What is claimed is:

1. An emergency call system for a vehicle, comprising:
a call generator provided in the vehicle and configured to, based on a command signal being received, generate an emergency call; and
a controller configured to:
collect emergency data at predetermined time intervals from a starting of the vehicle,
generate a dataset including the emergency data collected for a predetermined period of time, and
transmit, based on the emergency call being generated, the dataset to an emergency rescue server,
wherein, in response to a failure to collect a portion of the emergency data at a measurement time interval, (i) the portion of the emergency data collected at the measurement time interval is deleted, (ii) the portion of the emergency data is replaced with normal emergency data collected at a subsequent measurement time interval, and (iii) the normal emergency data is stored.

2. The emergency call system of claim 1, wherein the controller comprises:
an emergency data collector configured to:
collect the emergency data including location information of the vehicle, for the predetermined period of time at each predetermined time interval, and
generate the dataset; and
an emergency call controller configured to transmit, based on the emergency call being generated, the dataset to the emergency rescue server.

3. The emergency call system of claim 2, wherein the emergency data collector is configured to:
collect, as the emergency data, at least one of latitude and longitude information, traveling direction information, location accuracy-related information, or an instantaneous speed of the vehicle.

4. The emergency call system of claim 2, further comprising:
a data corrector configured to, based on a reliability of the emergency data being low, replace the emergency data with new emergency data or correct the emergency data.

5. The emergency call system of claim 4, wherein the data corrector is configured to:
based on global positioning system (GPS) data not being received from a GPS module, (i) correct latitude and longitude information of the vehicle using navigation information received from a navigation system and (ii) store the corrected information.

6. The emergency call system of claim 4, wherein the data corrector is configured to:
based on (i) GPS data received from a GPS module being determined to indicate a location where the vehicle is not able to move during the measurement time interval and (ii) a comparison between the GPS data and GPS data collected at a previous measurement time interval, determine a failure of collection of the GPS data.

7. The emergency call system of claim 2, wherein the emergency call controller is configured to, based on a state of a head unit of the vehicle entering a sleep state, initialize the dataset by deleting the emergency data in the dataset.

8. The emergency call system of claim 1,
wherein the emergency rescue server configured to receive the dataset and estimate a current location of the vehicle by analyzing a location and a traveling direction of the vehicle based on the dataset,
wherein the emergency rescue server comprises:
an emergency data receiver configured to:
receive the dataset transmitted from the controller,
store the dataset in a memory device, and
verify the emergency data of the dataset, and
a travel trajectory analyzer configured to:
determine a change in a location of the vehicle based on the emergency data,
analyze a travel trajectory of the vehicle during the predetermined period of time, and
estimate the current location of the vehicle.

9. The emergency call system of claim 8, wherein the emergency rescue server further comprises:
a map projection analyzer configured to:
project, onto a map, latitude and longitude information of the vehicle during a time period obtained from the dataset, and
estimate the current location of the vehicle upon receiving the emergency call.

10. The emergency call system of claim 9, wherein the emergency rescue server further comprises:
an accident occurrence notifier configured to transmit a notification of an accident to nearby vehicles based on the estimated location.

11. An emergency call method for a vehicle, comprising:
collecting, at predetermined time intervals, emergency data including location information of the vehicle;
generating a dataset including the emergency data collected at the predetermined time intervals for a predetermined period of time;
connecting, by a controller, to a call center upon an occurrence of an emergency call;
transmitting the dataset to an emergency rescue server;
receiving the dataset by emergency rescue server;
storing the dataset in a memory device by emergency rescue server; and
verifying the emergency data in the received dataset; and
determining a change in a location of the vehicle based on the emergency data;
analyzing a travel trajectory of the vehicle during the predetermined period of time;
estimating a current location of the vehicle;
replacing the emergency data with new data or correcting the emergency data; and
storing, based on a reliability of the emergency data being low, the new data or the corrected data,
wherein replacing the emergency data and storing the new data or the corrected data comprises:
in response to a failure to collect a portion of the emergency data at a measurement time interval, (i) deleting the portion of the emergency data collected at the measurement time interval, (ii) replacing the portion of the emergency data with normal emergency data collected at a subsequent measurement time interval, and (iii) storing the normal emergency data.

12. The emergency call method of claim 11, wherein replacing the emergency data and storing the new data or the corrected data comprises:

based on global positioning system (GPS) data not received from a GPS module, correcting latitude and longitude information of the vehicle using navigation information received from a navigation system and storing the corrected information.

13. The emergency call method of claim 11, wherein replacing the emergency data and storing the new data or the corrected data comprises:

based on (i) GPS data received from a GPS module being determined to indicate a location where the vehicle is not able to move and a comparison between the GPS data and GPS data collected at a previous measurement time interval, determining a failure of collection of the GPS data.

14. The emergency call method of claim 11, wherein connecting to the call center comprises:

based on a state of a head unit of the vehicle entering a sleep state, initializing the dataset by deleting the emergency data in the dataset.

15. The emergency call method of claim 11, further comprising:

projecting, onto a map, latitude and longitude information of the vehicle during a time period obtained from the dataset; and estimating the current location of the vehicle upon receiving the emergency call.

16. The emergency call method of claim 15, further comprising:

transmitting a notification of an accident to nearby vehicles based on the estimated location.

17. A non-transitory computer-readable storage medium storing instructions that, when executed by a processor, cause the processor to perform operations comprising:

collecting, at predetermined time intervals, emergency data including location information of a vehicle;

generating a dataset including the emergency data collected at the predetermined time intervals for a predetermined period of time;

connecting, by a controller, to a call center upon an occurrence of an emergency call;

transmitting the dataset to an emergency rescue server;

receiving the dataset by the emergency rescue server;

storing the dataset in a memory device by emergency rescue server; and verifying the emergency data in the received dataset; and determining a change in a location of the vehicle based on the emergency data;

analyzing a travel trajectory of the vehicle during the predetermined period of time;

estimating a current location of the vehicle;

replacing the emergency data with new data or correcting the emergency data; and storing, based on a reliability of the emergency data being low, the new data or the corrected data, wherein replacing the emergency data and storing the new data or the corrected data comprises:

in response to a failure to collect a portion of the emergency data at a measurement time interval, (i) deleting the portion of the emergency data collected at the measurement time interval, (ii) replacing the portion of the emergency data with normal emergency data collected at a subsequent measurement time interval, and (iii) storing the normal emergency data.

\* \* \* \* \*